(No Model.)
J. T. WAINWRIGHT.
PROCESS OF REDUCING UNSMELTED ORE.
No. 417,691. Patented Dec. 17, 1889.
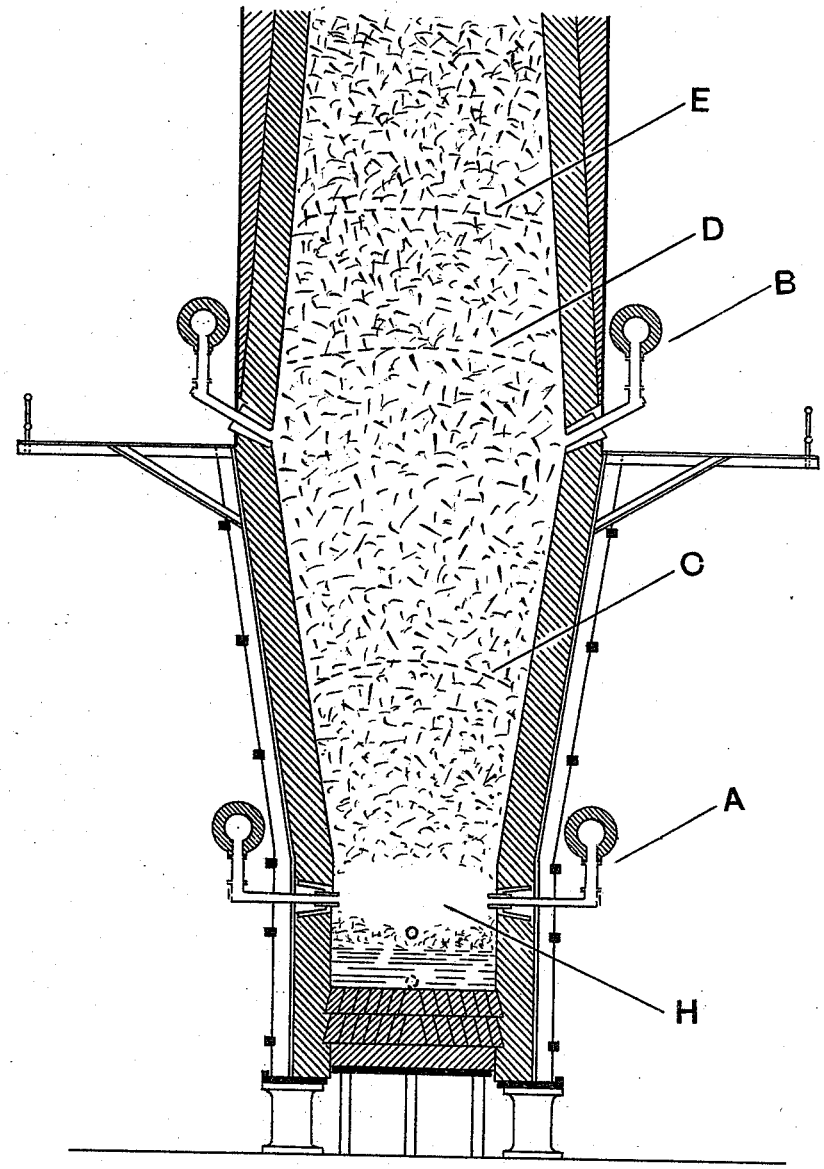
WITNESSES:
J. E. Dykmann.
S. B. Allison.
Jacob T. Wainwright INVENTOR

UNITED STATES PATENT OFFICE.

JACOB T. WAINWRIGHT, OF PITTSBURG, PENNSYLVANIA.

PROCESS OF REDUCING UNSMELTED ORE.

SPECIFICATION forming part of Letters Patent No. 417,691, dated December 17, 1889.

Application filed June 5, 1889. Serial No. 313,193. (No model.)

*To all whom it may concern:*

Be it known that I, JACOB T. WAINWRIGHT, a citizen of the United States, and a resident of Pittsburg, in Allegheny county, Pennsylvania, have invented certain new and useful Improvements in the Process of Reducing Unsmelted Ore, including Roasted Ore, Furnace-Cinders, and like Material, of which the following is a specification.

My invention relates to an improved method of operating a shaft furnace, whereby a more complete separation of impurities from the metal is effected, and it is more particularly adapted to the smelting of phosphoric iron ores.

When smelting iron ores in the usual blast-furnace, it has been observed that the early stages of reduction occur at the upper part of the shaft, and that from the spongy iron there produced a cinder liquates which is extremely fusible and rich in oxide of iron. It has also been observed that this cinder contains in an unreduced condition nearly all of the phosphorus that was in the ore, and that the proportion of phosphorus that is thus separated from the sponge iron is dependent upon the quantity of unreduced oxide of iron contained in this cinder. On account of the comparatively low temperature maintained in the upper part of the furnace the cinder is not completely fused until it has gravitated with the charge into the parts below; but during this descent it is acted upon by the reducing gases passing through the shaft, which effect a partial reduction, and thereby reduce not only a portion of the iron therefrom, but also some of the phosphorus. The phosphorus thus reduced alloys with the iron and contaminates the furnace product. Also, the fusibility of the cinder is lessened by this partial reduction. By the usual blast-furnace practice the iron and cinder are liquefied simultaneously at different altitudes in the shaft and gravitate together into the hearth, and when the charge is regulated to produce a cinder that is rich in unreduced oxide of iron the presence of this kind of cinder prevents the carbonizing of the iron at the lower part of the furnace. Thereby the production of a fluid metal is prevented, the iron reaches the hearth in a semi-fused and spongy condition, and is difficult to remove. This is the reason why it has heretofore been impracticable to utilize the cinder for dephosphorizing purposes in a blast-furnace when it was desired to produce the metal in a fluid condition.

It has been observed that the zone of melting temperature for cinders is considerably higher in the shaft than that for iron. This is due to the difference in the respective melting temperatures for iron and cinder. It has also been observed that with other things being equal the completeness of the reduction from the cinder is dependent upon the distance that is maintained from the melting-zone for cinder to the top of furnace-charge.

By my invention, which consists in a certain method of operating a shaft-furnace, I adapt operations so as to utilize the phenomena explained in this last paragraph for the purpose of producing to a considerable degree an alternate liquefaction of metal and rich cinder, whereby they may be collected in the hearth separately and alternately. I thereby avoid to a great extent a simultaneous melting of metal and rich cinder, and therefore the furnace may be run on a rich cinder for dephosphorizing and other purposes, and at the same time the metal may be carbonized and produced in a desirable fluid condition. The manner in which I effect this separate melting of the cinder consists in maintaining the charge in the furnace-shaft, introducing blasts into the charge at different altitudes that are respectively above and below a portion of the charge that has not gravitated into the hearth, and causing these blasts that are at different altitudes to alternately increase and diminish relatively with respect to the quantity of gases simultaneously delivered. This effects the position of the zone of melting temperature for cinder and causes it to alternately ascend and descend. When this zone ascends, the cinder becomes richer and gravitates into the furnace-hearth, and when this zone is caused to descend more rapidly than the furnace-charge the cinder will not melt. In order to effect a rapid motion to this zone it is desirable to blast the furnace-charge alternately above and below the melting-zone of the metal. It is also desirable to maintain a considerable distance between these respective altitudes of blasting; but in order that the tuyeres and lower part of furnace may be kept clear it is not always desirable to completely shut off the blast from these parts.

Referring to the figure of the drawing, which represents a sectional elevation of the lower portion of a shaft furnace, at A are shown the usual tuyeres in the furnace-hearth. At the higher elevation B is shown an additional set of tuyeres.

In operating according to my improvement the furnace is charged in the usual manner with ore, flux, and fuel, in suitable proportions, the furnace-blast is introduced through the tuyeres A and B alternately, the molten metal and cinder is tapped from the hearth H in the usual manner, and the blast may be preheated when the nature of the ore under treatment makes it desirable.

For the purpose of demonstration, the zone where the metal melts is shown at C. The metal melts at this altitude, gravitates through the interstices of the unconsumed fuel that is below, and from thence into the hearth.

When the furnace has been operated for a considerable time with the blast introduced through the tuyeres at A and shut off from those at B, the zone where the cinder melts is shown at D. This is the condition of affairs in the usual blast-furnace practice, and the usual grade of cinder results; but when the blast is shut off from the tuyeres at A and introduced through those at B this melting-zone of cinder rises from the intense heat produced near the tuyeres until it has reached the somewhat cooler altitude shown at E, whereby the ore in gravitating from the top of the furnace is exposed to more rapid changes in temperature, and consequently is not so completely reduced, and the cinder thus melted is rich in unreduced metallic matter.

It is desirable to place the upper tuyeres above that portion of the charge that contains the fully-reduced metal, whereby this metal may not be melted and brought down into the hearth by the operation of these tuyeres; but rich cinder containing most of the impurities of the ore is melted and brought down into the hearth by operating these upper tuyeres. In order not to contaminate the metallic product of the furnace, it is desirable to run this rich cinder from the hearth before changing the blast to the lower tuyeres. After having thus brought down a suitable amount of rich cinder with impurities the blast is shut off from the tuyeres at B and introduced through those at A. This change causes the reduced metal to melt at the zone C, and cinder does not commence to run until that portion of the charge at E has gravitated to the zone shown at D, and when the cinder does melt it is of the usual nature. The metal and cinder melted during this operation is collected and tapped from the hearth in the usual manner. The frequency and duration of these alternate operations depend upon the nature of the ore, fuel, flux, and other considerations. Regularity in alternating the blasts insures uniformity in the quality of the furnace product and prevents scaffolding.

A desirable feature of my invention is, that an ordinary blast-furnace may be adapted to this purpose simply by supplying the auxiliary tuyeres at B and valves for alternating the blast. I prefer these valves to be of the butterfly type.

The inside lining of my furnace may be in part or in whole of such acid, neutral, or basic material as has heretofore been used in constructing metallurgic furnaces, particularly such as will resist the action of a scouring-cinder; but it may be remarked that furnace-linings are greatly improved by being made thin and properly cooled.

The scope of my invention is not limited to the use of air-blasts, for in like manner a gas-fuel shaft furnace may be adapted to this purpose, particularly such as described in my application for Letters Patent, Serial No. 284,036. Also, the direction which the blast may be caused to take through the shaft is immaterial.

I am aware that shaft furnaces have been constructed in which the blast is introduced at different altitudes; but it has not heretofore been proposed to alternately increase and diminish the relative quantity of gases simultaneously introduced into the charge at different altitudes that are respectively above and below a portion of the charge that has not gravitated into the hearth. Nor has it heretofore been attempted in a shaft furnace to bring down rich cinder and metal separately.

It is herein understood that a shaft furnace is one in which a blast is caused to pass through a shaft and permeate the furnace-charge confined therein. It is also understood that the hearth of a shaft furnace is the comparatively open part of furnace below the supported furnace-charge.

The use of a furnace with a hearth is not always necessary, nor is it a part of my invention, as the furnace may be constructed with walls that do not uphold the furnace-charge.

Having described my invention, what I claim, and desire to secure by Letters Patent, is—

1. In the art of reducing unsmelted or partly smelted ore, the improved process which consists in charging ore into a shaft furnace, introducing blasts into the charge at different altitudes that are respectively above and below a portion of the charge that has not gravitated into a hearth, and causing these blasts to alternately increase and diminish in their relative quantity of gases simultaneously delivered, substantially as set forth.

2. In the art of reducing unsmelted or partly smelted ore, the improved process which consists in charging ore into a shaft furnace and alternately introducing blasts into the charge at different altitudes that are respectively above and below a portion of the charge that has not gravitated into a hearth, substantially as set forth.

JACOB T. WAINWRIGHT.

Witnesses:
J. E. DYKMANN,
S. C. ALLISON.